United States Patent [19]

Loving, Jr.

[11] 3,932,211
[45] Jan. 13, 1976

[54] METHOD OF AUTOMATICALLY MONITORING THE POWER DISTRIBUTION OF A NUCLEAR REACTOR EMPLOYING MOVABLE INCORE DETECTORS

[75] Inventor: James J. Loving, Jr., Murrysville, Pa.

[73] Assignee: Westinghouse Electric Corporation, Pittsburgh, Pa.

[22] Filed: July 13, 1973

[21] Appl. No.: 379,159

[52] U.S. Cl. ............................. 176/19 R; 250/392
[51] Int. Cl.[2] ........................................ G21C 17/00
[58] Field of Search ............... 176/19 R, 20, 26, 27; 250/390, 391, 392

[56] References Cited
UNITED STATES PATENTS

| | | | |
|---|---|---|---|
| 3,751,333 | 8/1973 | Drummond et al. | 176/19 R |
| 3,752,735 | 8/1973 | Musick et al. | 176/19 R |
| 3,769,156 | 10/1973 | Brecy | 176/19 R |

*Primary Examiner*—Stephen C. Bentley
*Attorney, Agent, or Firm*—D. C. Abeles

[57] ABSTRACT

A method of automatically monitoring the power distribution of a nuclear reactor during normal power operation employing in-core detectors maintained within the thermal environment of the reactor at a prearranged storage location, normally outside the core reactivity region. The detectors are intermittently inserted into the core region according to a periodic predetermined time program. Upon insertion, the detectors are moved along corresponding preselected linear paths which terminate at the detector storage locations. Detector output vs. position is continuously recorded during travel to provide a partial core flux map.

Four detectors, arranged in two electronically redundant groups, are alternately inserted into the core at staggered intervals dictated by the time program to obtain the desired flux information. Reinitation of the program is effected upon a given movement of the reactor control rods to remap the corresponding reactivity changes and provide a complete and updated readout of the reactor core power distribution.

11 Claims, 8 Drawing Figures

METHOD OF AUTOMATICALLY MONITORING THE POWER DISTRIBUTION OF A NUCLEAR REACTOR EMPLOYING MOVABLE INCORE DETECTORS

BACKGROUND OF THE INVENTION

This invention pertains generally to a method for monitoring the power distribution of a nuclear reactor and more particularly to a nuclear reactor monitoring method employing movable in-core neutron detectors.

In many of the reactors presently in operation, reliance for neutron flux level measurements, as used in the reactor control and protection systems, has been placed on out-of-core detectors supplemented by the in-core flux mapping system which has been in use since as early as 1967; with the latter intended to provide proofs of core design and some calibration measurements.

With a growing trend toward larger reactor cores, there has been some concern as to the possible adverse effects of core power distributions and whether out-of-core detectors could adequately detect such possible adverse distributions. Test data showed that the split section out-of-core detectors, presently in use, responded to axial flux tilts, but the accuracies of the tilt measurements were affected by the geometry and construction materials employed at the detector wells and by the spacing between the vessel and the detectors. Correction factors were developed for these effects, but there is still some question as to whether out-of-core detectors will in all cases provide adequate alarm of adverse power distributions.

A concerned governmental agency has suggested that a monitoring and alarm system utilizing fixed in-core detectors be provided for plants with a design $F_Q$ (the ratio of the peak local power to the average core power density) below the value of 2.50, so that the operator can be afforded continuous surveillance of the axial distribution. The governmental position includes a statement that the required system should be a fixed in-core detector system or "a better system".

A relative evaluation of performance of the fixed detector system is obtained by comparison with alternative systems which are currently performing, or could be developed to perform, the same function. The alternative systems considered include: the out-of-core long ion chamber system; the ion chamber system augmented by a third section; and selected movable in-core detector signals frequently taken.

The desirability of any surveillance system will depend first upon its accuracy ; secondly, upon its availability when reactor limits are approached; and thirdly, upon its usefullness to the plant operator as a tool for indicating the best mode of corrective action to be taken.

A fixed in-core system will meet only the second criterion. It has been shown, however, that frequent use of a movable in-core detector system can provide the most useful approach to monitoring the core average axial peaking factor, $F_z$.

SUMMARY OF THE INVENTION

Briefly, this invention satisfies the aforedescribed criteria by providing a more accurate, detailed, automatic, frequently update, data readout of reactor core power distribution. A novel method of employing the movable in-core neutron detectors in taught to yield a more sensitive running partial core flux map over normal power operation, indicative of the relative neutron density of the core.

The detectors are inserted into the reactor core region during normal power operation according to a predetermined, intermittent, time program. Upon insertion the detectors are automatically driven through the core region along fixed predetermined paths. The outputs of the detectors are recorded as a function of core location to provide a graphical representation of the reactor power distribution.

In the preferred embodiments, a plurality of detectors are arranged in electrically redundant groupings and are normally stored within the reactor thermal environment outside of the core reactivity region to minimize thermal cycling. As dictated by the predetermined time program, alternate groupings of detectors are driven along corresponding linear paths within the core at staggered time intervals governed by the reactor core physics. The programmed detector drive sequence is automatically reinitiated upon a given controlled reactivity change to provide the most meaningful data input to the plant operator.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

In accordance with this invention a method is taught which provides an automatic, frequently updated readout of the reactor core axial peaking factor derived from the novel operation of a movable in-core detector system which has been in use in pressurized water reactor since 1967. The basic function of the method is to provide partial or full core maps for the determination and verification of core power distributions occurring during normal reactor operation, or abnormal power distributions resulting from misplaced rods or other anomalies. The system, employed as currently designed, is fully described in report WCAP-7607, entitled "In-Core Instrumentation" (available to the public from the Westinghouse Electric Corporation, Nuclear Energy Systems, Post Office Box 355, Pittsburgh, Pa, 15230).

The system consists of four, five or six detector/drive assemblies, depending upon the size of the plant (two, three or four loops), which are interconnected in such a fashion that they can assess various combinations of in-core flux thimbles. To obtain the thimble interconnection capability, each detector has associated with it a five path and ten path rotary mechanical transfer device. A core map is made by selecting, by way of the transfer devices, particular thimbles through which the detectors are driven. To minimize mapping time, each detector is capable of being run at high speed (72 feet per minute) from its withdrawn position to a point just below the core. At this point, the detector speed is reduced to 12 feet per minute and the detector traversed to the top of the core, direction reversed, and the detector traversed to the bottom of the core. The detector speed is then increased to 72 feet per minute and the detector is moved to its withdrawn position. A new flux thimble is selected for mapping by rotating the transfer devices and the above procedure repeated.

Figure 1:
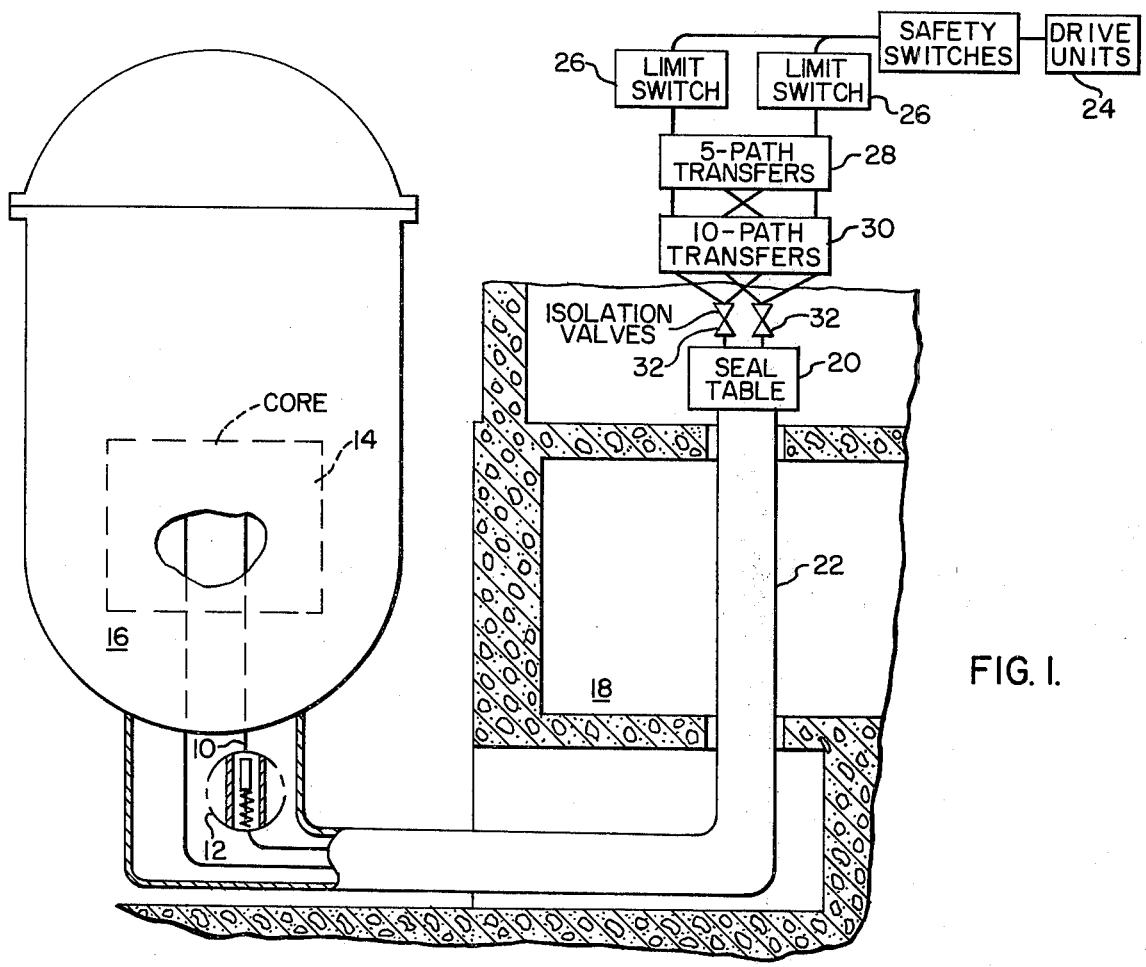
FIG. 1 is a perspective view illustrating the basic flux mapping system employed in the method of this invention.

FIG. 1 shows the basic system for the insertion of the movable miniature detectors. Retractable thimbles 10, into which the miniature detectors 12 are driven, take the routes approximately as shown. The thimbles are inserted into the reactor core 14 through conduits extending from the bottom of the reactor vessel 16 through the concrete shield area 18 and then up to a thimble seal table 20. Since the movable detector thimbles are closed at the leading (reactor) end, they are dry inside. The thimbles thus serve as a pressure barrier between the reactor water pressure (2500 psig design) and the atmosphere. Mechanical seals between the retractable thimbles and the conduits are provided at the seal table 20. The conduits 22 are essentially extensions of the reactor vessel 16, with the thimbles allowing the insertion of the in-core instrumentation movable miniature detectors. During operation, the thimbles 10 are stationary and will be retracted only under depressurized conditions during refueling or maintenance operations. Withdrawal of a thimble to the bottom of the reactor vessel is also possible if work is required on the vessel internals.

The drive system for insertion of the miniature detectors includes basically drive units 24, limit switch assemblies 26, five path rotary transfer devices 28, 10 path rotary transfer devices 30, and isolation valves 32, as shown.

Each drive unit pushes a hollow helical-wrap drive cable into the core with a miniature detector attached to the leading end of the cable and a small diameter coaxial cable, which communicates the detector output, threaded through the hollow center back to the trailing end of the drive cable.

Current requirements of the flux mapping system consist of multiple full core maps in conjuction with the core startup physics measurements (typically 25 maps over a 6 week period), and monthly full core maps thereafter. In addition partial or full core maps (equivalent to about 150 detector insertions per year) are made in support of research and development work. This utilization of the system represents an average of about five hundred cycle insertions for each detector during the first year of plant operation.

The method of this invention applies the movable detector system described to obtain frequent measurements of core peaking factors on a manual or automatic, repetitive basis and represents, in some ways, a less severe application of the system. In the preferred embodiment of this invention four flux thimbles are preselected which will provide representative flux measurements. Having selected the paths, the corresponding detectors will be parked inside the pressure vessel but below the core. In this mode of operation, the detectors will be run at slow speed (12 feet per minute) from their parked position to the bottom of the core, traversed to the top of the core, the direction reversed and the detectors withdrawn through the core (still at slow speed) to the bottom of the core, and finially withdrawn at slow speed to their parked position. Flux computations will be performed over the core dimension. Total time in the core is approximately two minutes, which is the same exposure time each detector experiences during one insertion of the normal mode of operation of the flux mapping system. One advantage obtained from following the steps of the method of this invention requiring storing the detectors inside the pressure vessel, is the removal of the severe effects of thermal cycling. Additionally, the detectors will only be subjected to a simple linear translation rather than a long, tortuous path through the transfer devices. Both factors will contribute towards increased reliability in the monitoring mode of the invention over that obtained in the normal mode of operation of the flux mapping system if the latter were to be used with increased frequency anticipated by this invention.

After the detectors are in their parked position, actuation of the drives will be accomplished either upon demand by the plant operator, automatically, or upon a change in full length or part length control rod position. To provide deadband in system startup, a total of approximately five steps (in one direction) of part length or full length rod motion is required. Of course, it should be understood that this specification can be varied to suit any application. In the preferred form, measurements of ex-core power will deactivate the monitoring system below a preset power level, such as 80% power. The exemplary monitoring program graphically illustrated in FIG. 4, which is dependent upon reactor core physics, will cycle two detectors at a time — i.e., the first peaking factor data will be obtained using two detectors and the second set of data will be obtained using a second set of detectors. A third set of detectors, if available, will not normally be used as part of this system. However, should a particular detector become unusable, the remaining detectors can be set up to operate in this system. Since only one detector is necessary to provide the required flux information, the system can be kept operational even with multiple detectors inoperable. Thus, the redundancy in providing two detectors to a set, or group, increases the overall reliability of the monitoring system.

To accommodate the normal monthly flux mapping of the core, using the standard method described, plant power would be reduced below the power level required to deactivate the monitoring system of this invention and control switched to the standard, existing flux mapping system. The monthly full core mapping would then be performed, as at present, using the flux mapping system and established procedures.

In this embodiment the signal conditioning circuitry associated with each detector calculates the peak to average factor for each trace; an alarm set point for each detector is calculated continuously in the equipment as a function of power; a single annunciator is actuated should any computation exceed the calculated alarm set point; the display system provides a digital indication of the peaking factor and a time display indicating the time of the measurement; and a multi-pen minature recorder provides a trace of the axial flux distribution as well as the position of the part length control bank. Additionally, associated with the display are those indicator lights and switches which provide information on the status of the system and allow operator control.

Figure 2:
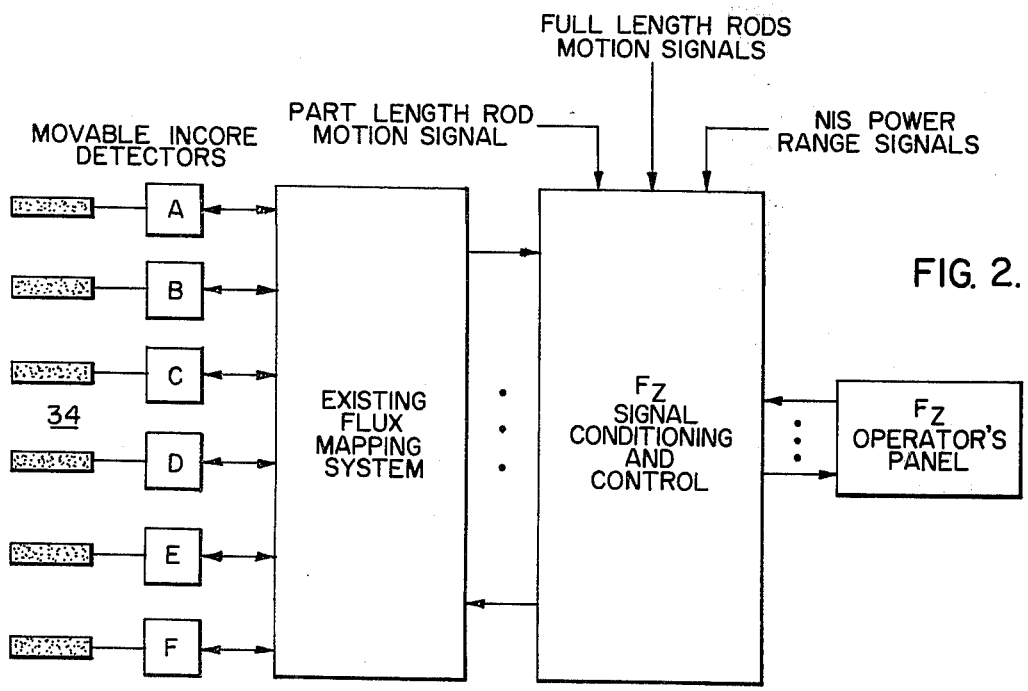
FIG. 2 is a block diagram of the electronics employed in the method of this invention.

A general description of the system in block form is shown in FIG. 2. Six detectors 34, normally associated with a four loop plant, are shown with their corresponding drives, respectively labeled, A, B, C, D, E and F, connected to the existing flux mapping system. Intercommunication between the existing system and the modification provided by the method of this invention is indicated by the block labeled $F_Z$ signal conditioning and control. Intercommunication between the outputs of the system and the control room are indicated by the unit marked $F_Z$ operator's panel. Additionally, inputs are shown from the part length and full length rod step control system for reinitiating the programmed insertion detector drive graphically illustrated in FIG. 4. Input signals are also provided from the ex-core nuclear instrumentation power range detectors for automatically disabling the system.

Figure 3:
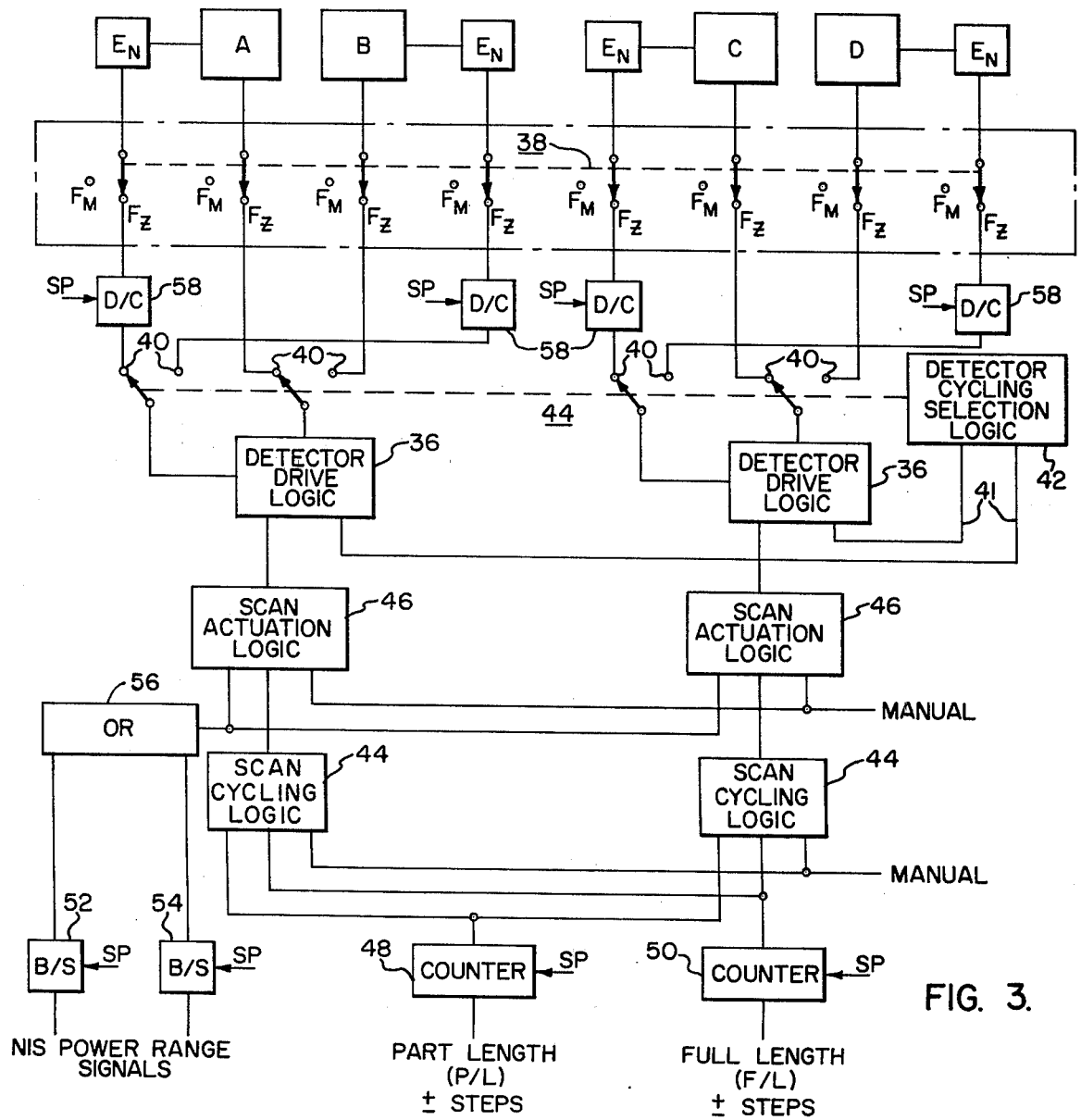
FIG. 3 is a more detailed block diagram of the detector drive circuitry of this invention.

The control circuitry for the detector drives are illustrated in more detail in block form in FIG. 3. The individual detectors are generally illustrated by their corresponding drive units A, B, C and D. Each detector drive has a corresponding encoder En, which records the position of the detector relative to the core. The respective encoders are coupled to corresponding decoder/comparator units 58, which compare the encoder output to a preselected setpoint Sp, corresponding to a predetermined position of the detector within the reactor. The respective decoder/comparator units provide outputs, as dictated by individual setpoints, to associated detector drive logic units 36, which control the movement and direction of the corresponding connected detectors. A master switch 38 is supplied to reconnect the electrical circuitry of the existing flux mapping system, represented by contact couplings $F_M$, to the apparatus provided to perform the mode of operation of this invention, indicated by contacts $F_Z$. Accordingly, when the method of this invention is employed, the master switch 38 is moved to the $F_Z$ position connecting the respective decoder/comparator units which will indicate the relative position of the corresponding detectors to the detector drive logic, which will in turn, command insertion of the appropriate connected detectors to their storage locations below the core of the reactor. While one setpoint programmed input is shown for each decoder/comparator unit, it should be appreciated that in this embodiment at least three will be provided corresponding to the top of the core, bottom of the core and storage locations within the reactor. Thereafter, unless interrupted by external signals the detector drive logic 36 will command movement of the corresponding detectors along their preselected paths of movement within the given flux thimbles according to the insertion program exemplarily illustrated in FIG. 4. The diagrammatical illustration provided in FIG. 3 shows detectors A and C connected in their scan position. After each scan, the detector drive logic 36 is reconnected to the alternate detector drives, i.e. B and D, through an interconnected master switch 44 controlled by the detector cycling selection logic 42. The cycling selection logic 42 is triggered at the end of each detector drive logic cycle through electrical connectors 41, to move the master switch 44 to the alternate detector drive contact 40.

To identify expected usage of the system requires reference to its functional requirements. The basic intent of this method is to determine the peaking factors whenever core parameters, which could cause a change in flux, are perturbed. Following such perturbations, it is necessary to provide periodic monitoring of the core to demonstrate that the peaking factors converge toward allowable values. Significant perturbations of the core arise from the movement of both full length and part length control rods. The resultant effect on peaking factors necessitates a renewed determination of the flux distribution. The secondary perturbation factor following rod motion is related to xenon redistribution. The axial redistribution of xenon proceeds over a period of 8 to 10 hours. Therefore, the suggestion period of frequency for the program cycle of measurements is eight hours. This latter consideration sets the maximum time interval between flux traces. Thus, in order to provide meaningful information on the core power distribution flux traces should be made following rod motion, and following the initial trend of power redistribution. In a base loaded plant, power changes would be a minimum, and core monitoring would be done automatically at least every 8 hours. For the load follow case, this cycle would be initiated following rod motion, or would revert to one flux trace every eight hours in the absence of rod motion.

Figure 4:
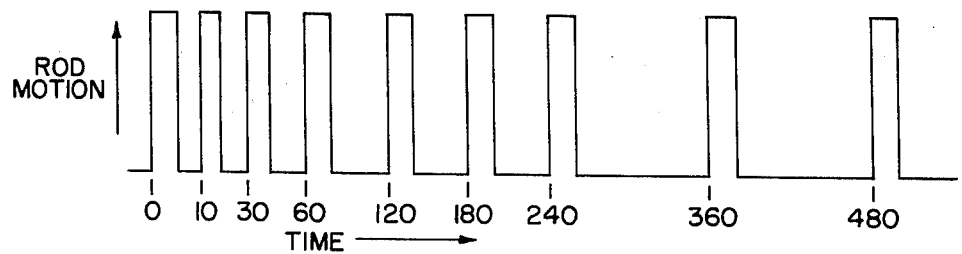
FIG. 4 is a graphical representation of the scan cycling logic of FIG. 3.

A periodic program capable of providing the most significant information on the core axial flux distribution is shown in the insertion timing diagram illustrated in FIG. 4. The preferred insertion program for accomplishing this end will effect insertion of alternate groups, or sets, of detectors at the indicated intervals. After the initial insertion of the first set of detectors, a second set will be inserted after a 10 minute interval; the first set reinserted after a 30 minute interval; the second reinserted after a 60 minute interval, etc.

Figure 6:
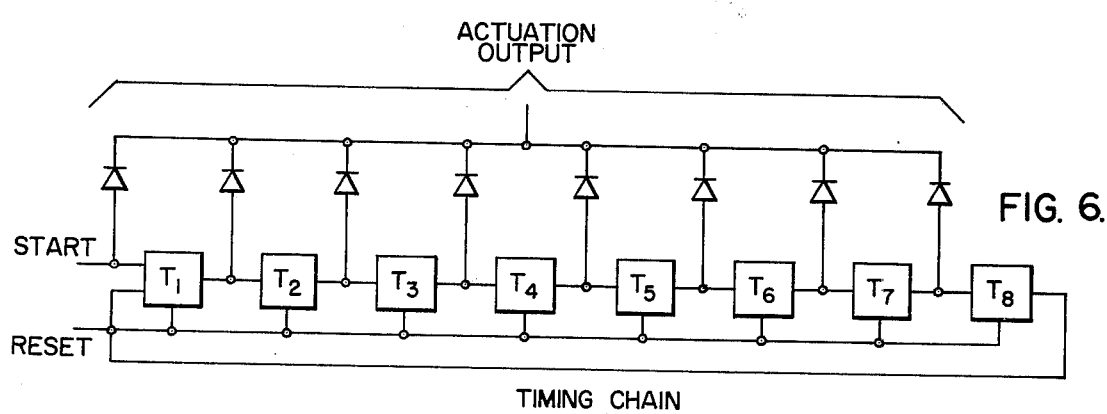
FIG. 6 is an exemplary timing chain capable of providing the timing program illustrated in FIG. 4.

The program insertion for each trace is effected by the scan cycling logic 44, illustrated in FIG. 3. Each of the described logic circuits can be constructed from state of the art components employing a routine application of circuit analysis and logic techniques. FIG. 6 illustrates one such circuit for accomplishing the scan cycling logic. Eight counters are shown respectively labeled $T_1$ to $T_8$. As connected, the initial insertion signal will start counter $T_1$ which will provide counts for 10 minutes. At the end of the 10 minute interval an insertion will be processed through the scan actuation logic to the detector drive logic, which will effect the first flux trace. At the same time, a second output will initiate a 30 minute count in the second counter $T_2$. At the end of the 30 minute interval the second counter will provide another scan actuation output as well as initiate a 60 minute count in the third counter $T_3$. The remaining counters cycle through their corresponding intervals in a similar manner. At the end of the eighth cycle, the output of the eighth counter, $T_8$, is employed to reset all eight counters and reinitiate the program. The outputs of the respective counters are "OR"ed together in the scan actuation logic 46, which provides the necessary signals to program the detector drive logic 36 to perform the insertion and withdrawal commands to the corresponding motor drives of the individual detectors connected. The initiating signal for the scan cycling logic is either provided from one of the two counters 48 and 50, or the manual input. The counters 48 and 50 respectively count the part length rod and full length rod steps and provide corresponding outputs upon the occurrence of a predetermined number of steps indicated by the program setpoints Sp. The outputs of the counters 48 and 50 and the manual input are ORed together in the scan cycling logic to start the reset terminals of the timing chain shown in FIG. 6, so that movement of either the part length or full length rods over a predetermined number of steps, or an additional manual input, will reinitiate the entire scan cycling program. Inputs are also supplied from the out-of-core instrumentation, labeled, NIS power range signals, through corresponding bistables 52 and 54, to the scan actuation logic. When the power range drops below the setpoint values specified by the programmed $S_P$ inputs on the bistables 52 and 54, the outputs of the bistables are communicated to the scan actuation logic through OR unit 56 to inhibit further insertion of the detectors into the core and disable the system so that normal flux mapping procedures can be accommodated. Manual inputs are also provided to the scan actuation logic to effect a single flux trace at the plant operator's discretion.

As a given set of detectors enter the core, the output electronics are initiated and continue monitoring the detector's performance through the entire flux scan of that set. The output initiating signal for activating the monitoring electronics is obtained from the decoder/comparator units of FIG. 3. The decoder/comparator units will provide an output 58 upon a decoder reading equal to a program setpoint indicative of the bottom of the core location. Similarly, as the detectors leave the core a second output will be provided at terminal 58 to disconnect the corresponding units from the readout processing electronics.

Figure 5A:
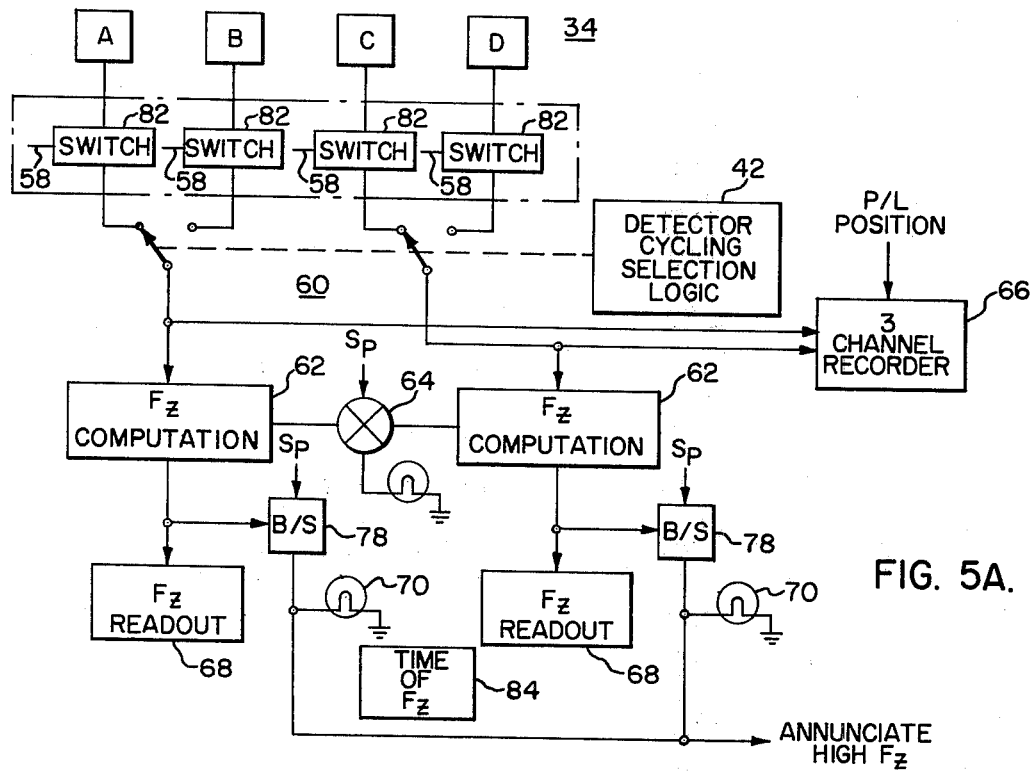
FIGS. 5A and 5B are block diagrams illustrating the detector readout electronics of the exemplary embodiment of the method of this invention.
Figure 5B:
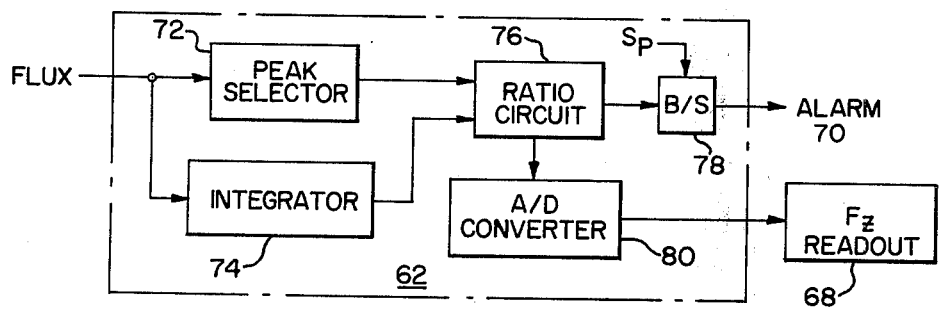
Figure 7:
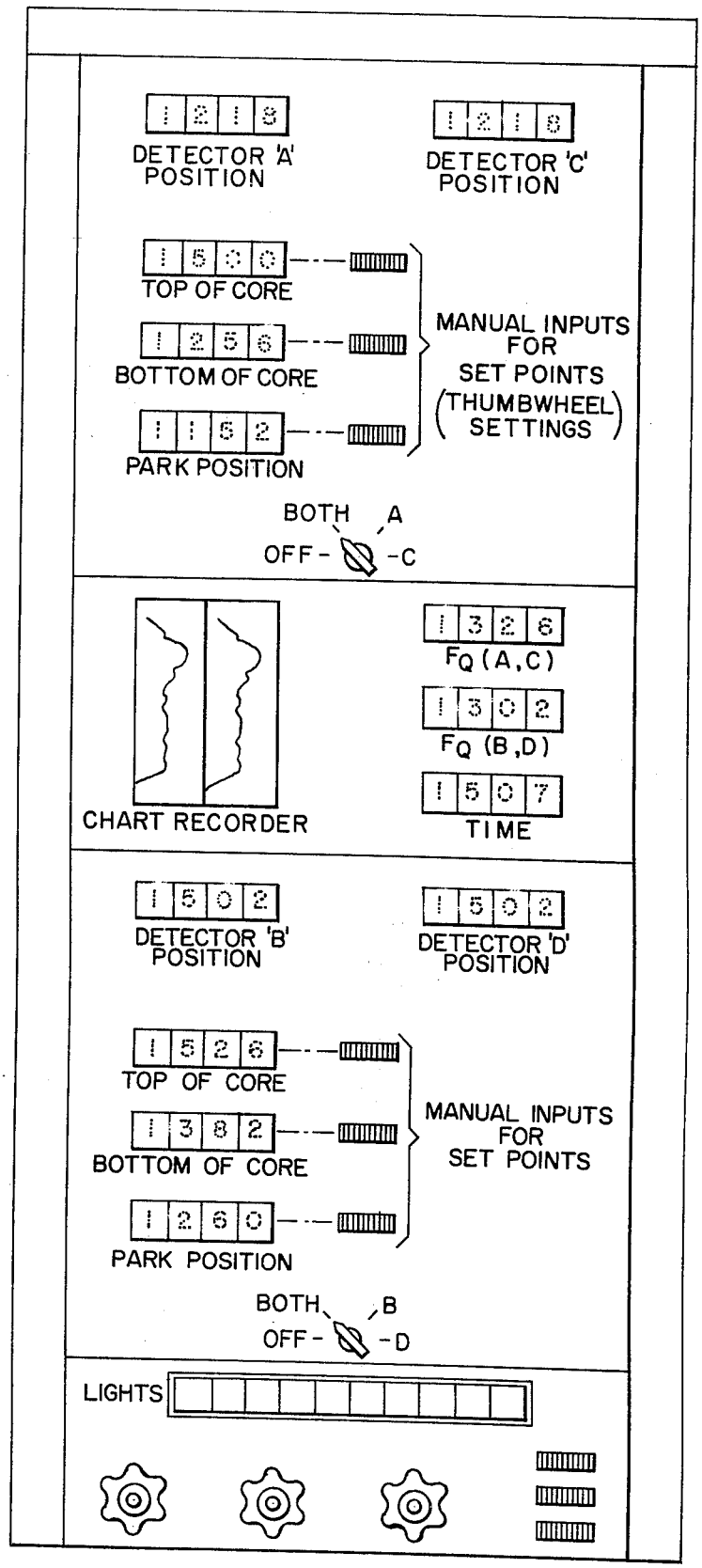
FIG. 7 is a conceptual illustration of the readout display of FIGS. 5A and 5B.

A more detailed view of the monitoring electronics is illustrated in FIGS. 5A and 5B with a conceptual layout of the display being shown in FiG. 7. The outputs 58 from the decoder comparators in FIG. 3 are connected to the corresponding switches 82 of FIG. 5A and enable communication between the respective detectors and the monitoring electronics. The readout electronics are provided in redundant groupings, one for each detector in a set. Master switch 60, controlled by an output from the detector cycling selection logic 42 in FIG. 3 connects the appropriate detectors being inserted into the core to the corresponding monitoring units. The outputs of the respective detectors being cycled are communicated to corresponding $F_z$ computation units 62, which are shown in more detail in FIG. 5B. The flux inputs from the detectors are fed in parallel to a peak detector 72 and an integrating circuit 74 which respectively compute the peak and average axial flux measurements. These values are communicated to a ratio detector 76 which provides the peak to average flux measurement $F_z$. The $F_z$ measurement is compared to a prescribed setpoint in the bistable 78 and an alarm 70 is annunciated if the setpoint is exceeded. At the same time the $F_Q$ measurement is processed through an analog to digital converter 80 for display on the readout 68. The corresponding outputs of the computation unit 62 are also compared to one another in a comparator unit 64 for any deviation that might exist. Theoretically, the radial flux distribution within the core should be the same, within a small percentage deviation such as 5% at each given core axial location. When a deviation exceeding a predetermined setpoint is noted by the deviation unit 64, an alarm is indicated to alert the plant operator. In addition to the outputs already noted, a three channel recorder 66 is supplied for displaying the outputs of the two detectors currently being monitored, as well as the part length rod position. Since the part length rods are employed to control the normal operation of the reactor, this should be sufficient. However, where desired, the full length rod position can also be displayed. The timing unit 84 is merely supplied to assist the plant operator in logging the readout of each trace.

The display is conceptually illustrated in FIG. 7 and includes a digital indication of the peaking factor $F_z$ (A, C) for detectors A and C, and $F_z$ (B, D) for detectors B and D, and the time display indicating the time of measurement. A multi-pen miniature recorder 66 provides a trace of the axial flux distribution as well as the position of the part length control bank. Also associated with the display panel are those indicator lights and switches which provide information on the status of the system and allow operator control. For example, the digital position of each detector in operation is shown and manual input settings are provided for the setpoints previously described, such as those for the decoder/comparator units which indicate the top of the core, bottom of the core and parked position of the detectors.

While the method of this invention has been applied to determine the axial peaking factor $F_Q$, other measurements can be obtained from the signals derived from the movable in-core detectors. For example, normalized peaks, axial offsets and quadrant tilts can also be calculated.

Thus, the monitoring method of this invention will provide automatic operation of the presently available movable detector in-core flux mapping system to give partial reactor core flux maps according to a predetermined programmed cycle, which can be reinitiated during load changes or on demand by the reactor operator to give computations of certain core parameters. This development will make better utilization of presently available flux mapping equipment to provide the plant operator with more accurate, repetitively updated, visual aids in changing the reactor flux distribution as required.

I claim as my invention:

1. A method of on line monitoring the normal power operation of a nuclear reactor using a movable in-core neutron detector comprising the steps of:
    automatically inserting and withdrawing the detector respectively into and out of the reactor core region, during normal power operation, at predetermined, staggered, intermittent, time, programmed, sequence intervals;
    moving the detector, upon insertion, through the core region along a fixed predetermined path; and
    recording the output of the detector as a function of core location.

2. A method of claim 1 including the step of storing the detector within the reactor thermal environment outside the reactive core region in a prearranged storage location prior to insertion into the core and wherein the fixed predetermined path of movement of the detector terminates at the storage location.

3. The method of claim 1 wherein a plurality of movable in-core detectors are employed to monitor the normal power operation of the nuclear core and wherein said moving steps moves the detectors along separate corresponding predetermined paths through the core.

4. The method of claim 3 wherein the detectors are arranged in groups and wherein the groups of detectors are alternately inserted into the core region of the reactor according to the predetermined time program.

5. The method of claim 4 wherein four-in-core detectors are employed to monitor the reactor, arranged in groups of two detectors each.

6. The method of claim 1 including the step of periodicaly repeating the predetermined time sequence.

7. The method of claim 6 wherein the predetermined sequence is repeated every eight hours.

8. The method of claim 1 wherein the reactivity of the core is alterable by control means, including the step of reinitiating the time sequence automatically upon a given change in reactivity of the core caused by the control means.

9. The method of claim 8 wherein the control means comprises control rods and the time sequence is reinitiated upon a given movement of the control rods within the core.

10. The method of claim 1 including the step of automatically calculating the peak to average value of the neutron flux as indicated by the detector output.

11. The method of claim 1 wherein the fixed predetermined path of the detector is linear.

* * * * *